Feb. 22, 1944.  G. M. GIANNINI  2,342,578
DAMPING DEVICE FOR AIRPLANE CONTROL SURFACES
Filed May 3, 1941
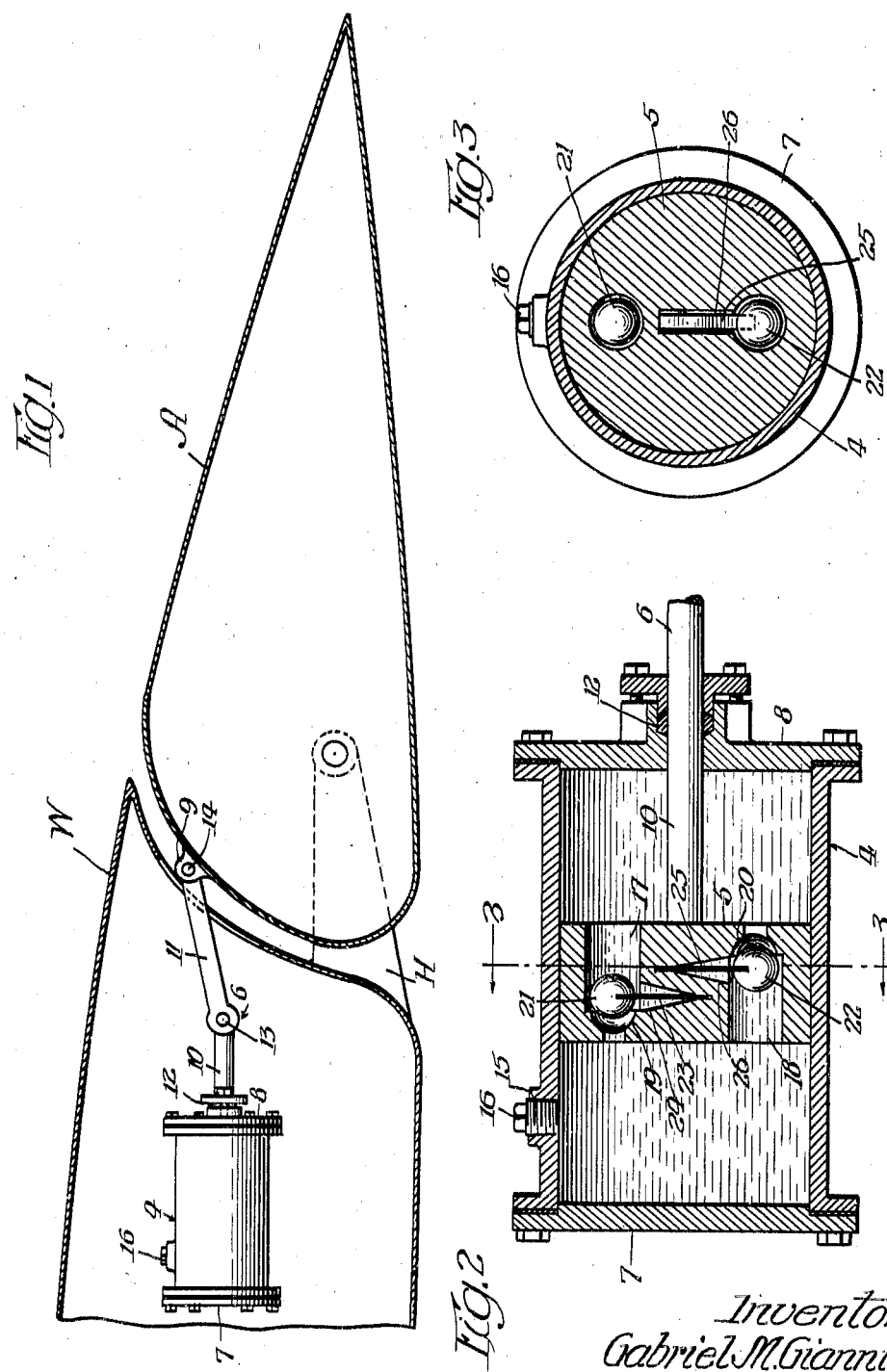
Inventor
Gabriel M. Giannini
By Fred Gerlach Atty.

Patented Feb. 22, 1944

2,342,578

UNITED STATES PATENT OFFICE 2,342,578

DAMPING DEVICE FOR AIRPLANE CONTROL SURFACES

Gabriel M. Giannini, North Hollywood, Calif., assignor, by mesne assignments, to Consolidated Vultee Aircraft Corporation, a corporation of Delaware Application May 3, 1941, Serial No. 391,652

8 Claims. (Cl. 244—75)

The present invention relates generally to damping devices. More particularly the invention relates to that type of damping device which is designed for use in connection with an airplane control surface, such as an aileron, elevator or rudder, serves as a medium for damping flutter or undesirable vibration or oscillation of the control surface, and comprises a fluid filled cylinder and a piston which fits slidably in the cylinder, is connected to the control surface so that it is caused to reciprocate in the cylinder in response to movement of the surface, and has a pair of ports therein for permitting the fluid in the cylinder to pass back and forth between the ends of the cylinder during reciprocation of the piston.

It has heretofore been customary in connection with a damping device of this type to provide the piston with a pair of spring closed valves for controlling the ports therein and so to arrange the valves that one is urged against the force of its spring into its open position in connection with sliding movement of the piston in one direction and the other is unseated or urged into its open position against the force of its spring in connection with sliding movement of the piston in the opposite direction. In practice it has been found that device with oppositely acting spring closed valves of the last mentioned character is objectionable or impractical for several reasons. In the first place the device operates to damp in the same manner all frequencies of flutter, vibration or oscillation of the control surfaces to which it is applied. Secondly, the spring closed valves for the piston ports so restrict passage of fluid through the ports in connection with sliding movement of the piston that the pilot of the airplane is caused to exert great force or effort when shifting the control surface for controlling purposes by way of the usual control surface shifting mechanism.

The primary or principal object of the instant invention is to provide a damping device of the type under consideration which is an improvement upon previously designed devices and not only eliminates the objectionable features of the latter but also is more practical and efficient. The improved device is characterized by the fact that the port controlling valves are normally open instead of normally closed and are so designed, adjusted and supported that when the piston is rapidly reciprocated, due to the control surface approaching a vibration frequency that is close to the undesirable flutter frequency, they automatically close or seat and thus stop movement of the piston and eliminate flutter, vibration or oscillation of the control surface while at the same time they are free to be unseated in response to a steady or gradual movement of the piston in either direction due to shift of the control surface by the pilot in connection with control of the airplane. By having the valves normally open and arranged in the aforementioned manner there is substantially no resistance or opposition to reciprocation of the piston in the cylinder except when fluttering, vibration or oscillation of the control surface occurs and hence under normal conditions, i. e., when there is no fluttering of the surface the pilot encounters no burden or great resistance in connection with manual shift of the control surface for controlling purposes. The only time that the pilot encounters any resistance to shift or control movement of the control surface is when the device is brought into play due to fluttering or undesirable vibration or oscillation of the surface and at such time control movement or shift of the surface is possible with but a small amount of additional effort on the part of the pilot.

Another object of the invention is to provide a flutter damping device which is generally of new and improved construction and not only effectively and efficiently fulfills its intended purpose but also is simple in design, light in weight and capable of being produced at a low and reasonable cost.

Other objects of the invention and the various advantages and characteristics of the present damping device will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a fragmentary vertical section showing a device embodying the invention applied to an airplane aileron;

Figure 2 is an enlarged vertical longitudinal section of the device; and

Figure 3 is a vertical transverse section taken on the line 3—3 of Figure 2 and illustrating in detail the arrangement, design and mounting of the oppositely acting normally open valves which are associated respectively with the two through ports in the piston of the device.

The device which is shown in the drawing constitutes the preferred embodiment of the invention. It is illustrated in connection with an airplane wing W having an aileron A at the trailing portion thereof, and, as hereinafter described, serves as a medium for automatically damping flutter or undesirable vibration or oscillation of the aileron. The aileron A is connected to the wing W by way of hinges H in order that it is free to swing upwards and downwards. It constitutes an airfoil and is controlled or shifted by the pilot of the airplane by conventional mechanism (not shown). Due to looseness of the hinges H and other well known factors there is a tendency for the aileron A to flutter, vibrate or oscillate when the airplane with which it is associated is flown at high speed.

As shown in Figure 1 of the drawing, the device for damping flutter or vibration of the aileron A is disposed for the most part in the wing W. As its main or principal parts the device comprises a cylinder 4, a piston 5 and a piston operating connection 6. The cylinder 4 is fixedly mounted in any suitable manner within the wing W. It is disposed directly in front of the aileron A in a position wherein it extends transversely of the wing. The front end of the cylinder is closed by a circular head 7 and the rear end of the cylinder is closed by a head 8. The interior of the cylinder is filled with any suitable fluid, such, for example, as light oil having a substantially constant viscosity throughout a wide temperature range. The piston 5 is mounted within the cylinder so as to slide forwards and backwards between the heads 7 and 8. The operating connection 6 of the device consists of an arm 9, a piston rod 10 and a connecting link 11. It is of such design or construction that it operates to effect reciprocation of the cylinder 5 in response to up and down movement of the aileron A. The arm 9 is fixedly secured to the forward or leading edge of the aileron A, as shown in Figure 1. The piston rod 10 is connected to, and projects rearwardly from, the central portion of the piston 5. It projects through, and is slidably mounted in, a stuffing box 12 in the central portion of the head 8 and embodies a cross pin 13 at its rear end. The connecting link 11 extends between and serves to connect the arm 9 to the piston rod 10. The rear end of the link 11 is pivotally connected to the arm 9 by a pin 14 and the front end of the link is pivotally connected to the rear end of the piston rod 10 by way of the pivot pin 13. The operating connection 6 between the piston and the aileron is such that the piston is caused to slide forwards in the direction of the head 7 in response to upward swinging movement or shift of the aileron A and is caused to slide reversely, that is, in the direction of the rear head 8 in connection with downward shift or swinging movement of the aileron. The interior of the cylinder 4 is filled with oil or other fluid by way of a hole 15 in the upper portion of the cylinder. This hole, as shown in Figure 2, has an internal screw thread and is normally closed by a screw threaded plug 16. In order to permit the piston 5 to move through the fluid in the cylinder 4 the piston is provided with a pair of cross ports 17 and 18. The port 17 is located in the upper portion of the piston and is so shaped or designed that it embodies a rearwardly facing hemispherical seat 19. The other port, i. e., the port 18, is located in the lower portion of the piston 5 beneath the port 17 and embodies in the central portion thereof a forwardly facing hemispherical valve seat 20. The two ports permit the fluid in the cylinder to flow from one side of the piston to the other in connection with reciprocation of the piston due to swinging of the aileron A. The two ports are of such size or cross sectional area that when they are open the fluid, in connection with reciprocation of the piston, flows freely from one side of the piston to the other and hence does not impeded or retard, to any material or appreciable extent, reciprocation of the piston due to control movement of the aileron. Because the piston is permitted to move freely through the fluid when the ports are open, due to the dimensioning of the ports, the pilot of the airplane encounters no appreciable resistance when the aileron A is manually shifted in connection with control of the airplane. In other words when the ports are open there is substantially no opposition by the damping device to manual shift of the aileron A in connection with control of the airplane.

In order to close the ports 17 and 18 when fluttering of the aileron A takes place, and thus curtail reciprocation of the piston and effect the desired damping two ball valves 21 and 22 are provided. These valves are associated with the through ports 17 and 18 respectively and, as hereinafter described, are normally open. The valve 21 is located in the central portion of the port 17. It is normally positioned slightly rearwards of the hemispherical seat 19 and has as the supporting means therefor a spring metal strip 23. The latter is disposed in a vertical or upstanding position, as shown in Figure 2, and has the lower end thereof fixedly attached to the piston 5. The upper end of the strip is anchored to the valve 21 and the central portion of the strip fits within a wedge shaped notch 24 in the piston interior in order that the strip, together with the valve 21, is free to swing to and from the seat 19. The valve 22 is located in the central portion of the through port 18. It is normally disposed a small distance in front of the seat 20 and is adapted, under certain circumstances and as hereinafter described, to seat against the seat 20 and thus block or cut off the flow of fluid through the port 18. A vertical or upstanding spring metal strip 25 serves yieldingly to support the valve 20. The upper end of the spring strip 25 is fixedly connected to the central portion of the piston 5 and the lower end of the strip fits within a notch in the valve 22 and is suitably locked in place. The central portion of the spring metal strip 25 fits within a wedge shaped recess 26 in order that the valve is permitted to swing or move into and out of seated relation with the seat 20. The two ball valves are tuned or adjusted to the flutter frequency of the aileron A. By this it is meant that the valves are so designed, adjusted and supported that when the piston 5 reciprocates at a frequency approaching or corresponding to the flutter frequency of the aileron A they move into seated relation with the hemispherical seats and thus restrict flow of the fluid in the cylinder through the ports and resultantly damp the piston and prevent further fluttering of the aileron. When the piston 5 moves rearwards to a slight extent in connection with fluttering of the aileron the valve 21 seats against the seat 19 and thus prevents any flow of fluid through the port 17 and when the piston moves forwards to a limited extent during aileron flutter the valve 22 moves rearwards into seated relation with the seat 20 and cuts off flow of fluid through through the port 18. Due to the rapid alternate closing or seating action of the two oppositely acting normally open valves restriction of flow of fluid through the piston takes place in connection with any fluttering or undesirable vibration or oscillation of the aileron. Such restricted flow produces the desired damping of piston reciprocation and aileron movement. When there is no fluttering of the aileron the valves 21 and 22 remain in their open position. When they are in such position the device as a whole imposes substantially no added burden on the pilot in connection with the manual shift of the aileron A for airplane controlling purposes. Should, in connection with control movement of the aileron, the ball valves be closed due to fluttering of the aileron the pilot is still able to shift the aileron since the control exercised by the valves is automatically overcome by the application of force to the aileron through the latter's operating mechanism. In general it may be said that so far as the device as a whole is concerned free passage of fluid from one side of the piston to the other is possible at all times except when the aileron to which the device is applied approaches the critical flutter frequency. When this occurs the ball valves operate to shut off the flow of fluid through the through ports in the piston and thereby cause damping of the flutter. At the same time, however, the control exercised by the ball valves may be overcome by application of force to the aileron through its operating mechanism, as hereinbefore pointed out.

The herein described damping device is essentially a simple one and hence may be manufactured at a low and reasonable cost. It effectively and efficiently fulfills its intended purpose and is characterized by the fact that it causes no appreciable resistance to normal control movements of the aileron or other control surface to which it is applied, except when flutter of the aileron or surface takes place. At such time the device, as heretofore pointed out, imposes but a slight burden on the pilot in connection with a control movement.

Whereas the damping device has been described and illustrated in connection with an aileron it is to be understood that it may be employed equally as well with any other control surface of an airplane, such, for example, as an elevator or rudder. It is also to be understood that the invention is not to be restricted to the details set forth since these may be modified within the scope of the appended claims without departing from the spirit and scope of the invention.

Having thus described the invention what I claim as new and desire to secure by Letters Patent is:

1. A damping device adapted for use in connection with a movable member subject to flutter, and comprising a fluid filled receptacle element, a fluid displacing element in the receptacle element, said elements being movable one relatively to the other, means for connecting one of the elements to the member so that it is movable therewith, means on said one element forming an open ended fluid passage for permitting the fluid in the receptacle element to flow from one side of the fluid displacing element to the other in connection with movement of said one element by the member, and a passage controlling valve yieldingly mounted on said one element so that it is movable in substantially tuned frequency to the flutter frequency of the member and arranged so that during normal movement of said one element in response to ordinary movement of the member it remains open and during rapid movement of said one element due to flutter of the member it moves rapidly back and forth into and out of a closed position with respect to the passage.

2. A damping device adapted for use in connection with a movable member subject to flutter, and comprising a fluid filled receptacle, a movably mounted fluid displacing element in the receptacle connected to the member so that it is movable back and forth in the receptacle in response to movement of said member and having a port therethrough for permitting the fluid in the receptacle to flow from one side of the element to the other in connection with movement of the element relatively to the receptacle, and a port controlling valve yieldingly mounted on the element so that it is movable in substantially tuned frequency to the flutter frequency of the member and arranged so that during normal back and forth movement of the element it remains open and during rapid back and forth movement of the element due to flutter of the member it moves rapidly back and forth into and out of a closed position with respect to the port.

3. A damping device adapted for use in connection with a movable member subject to flutter, and comprising a fluid filled cylinder, a slidably mounted piston in the cylinder connected to the member so that it is reciprocated in response to back and forth movement of the member and having a pair of through ports therein for permitting the fluid in the cylinder to flow from one side of the piston to the other in connection with sliding of the piston, a pair of oppositely acting valves associated with the ports respectively, mounted yieldingly on the piston so that they are movable in substantially tuned frequency to the flutter frequency of the member and arranged so that during normal movement of the piston in the cylinder they both remain open and during rapid reciprocation of the piston due to flutter of the member they move rapidly back and forth into and out of closed position with their respective ports but in alternate relation.

4. In combination with an airplane having a movable control surface subject to flutter, a flutter damping device for the surface comprising a fluid filled receptacle mounted on the airplane adjacent said surface, a movably mounted fluid displacing element in the receptacle connected to the surface for back and forth movement thereby and having a fluid passage therethrough for permitting flow of the fluid in the receptacle from one side of the element to the other during movement of said element by the control surface, and a passage controlling valve yieldingly mounted on the element by way of a spring metal strip so that it is movable in substantially tuned frequency to the flutter frequency of the surface and arranged so that during normal movement of the element in response to ordinary movement of the control surface it remains open and during rapid movement of said element due to flutter of the surface it moves rapidly back and forth into and out of a closed position with respect to the passage.

5. In combination with an airplane having a movable control surface subject to flutter, a flutter damping device for the surface comprising a fluid filled receptacle mounted on the airplane adjacent said surface, a movably mounted fluid displacing element in the receptacle connected to the surface for back and forth movement thereby and having a pair of passages therethrough for permitting the fluid in the receptacle to flow from one side of the element to the other during movement of the element by the surface, and a pair of oppositely acting valves associated with, and serving to control, the passages, respectively, yieldingly mounted on the element by way of spring metal strips so that they are movable in substantially tuned frequency to the flutter frequency of the surface, and arranged so that during normal movement of the element in the receptacle they both remain open and during rapid back and forth movement of the element due to flutter of the surface they move rapidly back and forth into and out of closed position with their respective ports but in alternate relation.

6. In combination with an airplane having a hinged pilot controlled control surface subject to flutter, a flutter damping device for the surface comprising a fluid filled receptacle mounted on the airplane adjacent said surface, a movably mounted fluid displacing element in the receptacle connected to the surface so that it is moved back and forth in response to swinging movement of the surface, and having a pair of through ports provided with oppositely facing valve seats and adapted to permit the fluid in the receptacle to flow from one side of the element to the other during movement of said element by the control surface, and a pair of oppositely acting valves associated with the ports, respectively, yieldingly mounted on the element so that they are movable in substantially tuned frequency to the flutter frequency of the surface, and arranged so that during normal back and forth movement of the element in connection with ordinary control movements of the surface they both remain open and during rapid back and forth movement of the element due to fluttering of the surface they move rapidly back and forth into and out of seated relation with their respective seats but in alternate relation.

7. In combination with an airplane having a movable control surface subject to flutter, a flutter damping device for the surface comprising a liquid filled cylinder mounted on the airplane adjacent said surface, a slidably mounted piston in the cylinder connected to the control surface so that it is caused to reciprocate in response to back and forth movement of the surface and having a seat equipped through port, therethrough, for permitting flow of the liquid in the cylinder from one side of the piston to the other during sliding movement of said piston by the control surface, and a port controlling valve yieldingly mounted on the piston by way of a spring metal strip so that it is movable in substantially tuned frequency to the flutter frequency of the surface, and arranged so that during normal sliding movement of the piston in response to control movements of the surface it remains open and during rapid reciprocation of the piston due to flutter of the surface it moves rapidly back and forth into and out of a closed position with respect to the port-seat.

8. In combination with an airplane having a hinged control surface subject to flutter, a flutter damping device for the surface comprising a liquid filled cylinder fixedly mounted on the airplane adjacent said surface, a slidably mounted piston in the cylinder connected to the control surface so that it is reciprocated in response to swinging movement of the surface and having a pair of through ports therein for permitting the liquid in the cylinder to flow from one side of the piston to the other in connection with sliding of said piston, and a pair of oppositely acting valves associated with the ports, respectively, mounted yieldingly on the piston by laterally flexible spring metal strips so that they are movable in substantially tuned frequency to the flutter frequency of the surface, and arranged so that during normal sliding movement of the piston in connection with control movements of the surface they both remain open and during rapid reciprocation of said piston due to flutter of the surface they move back and forth into and out of a closed position with respect to their respective ports but in alternate relation.

GABRIEL M. GIANNINI.